US011693613B2

(12) United States Patent
Takamoto (10) Patent No.: US 11,693,613 B2
(45) Date of Patent: Jul. 4, 2023

(54) PRINTING APPARATUS AND METHOD OF CONTROLLING PRINTING APPARATUS

(71) Applicant: SEIKO EPSON CORPORATION, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/651,428

(22) Filed: Feb. 17, 2022

(65) Prior Publication Data

US 2022/0261197 A1 Aug. 18, 2022

(30) Foreign Application Priority Data

Feb. 18, 2021 (JP) .................................. 2021-024014

(51) Int. Cl.
 *G06F 3/12* (2006.01)
(52) U.S. Cl.
 CPC .......... *G06F 3/1257* (2013.01); *G06F 3/1204* (2013.01); *G06F 3/1292* (2013.01)
(58) Field of Classification Search
 None
 See application file for complete search history.

(56) References Cited

U.S. PATENT DOCUMENTS

| 2013/0107301 | A1* | 5/2013 | Takagi | G06K 15/02 |
| | | | | 358/1.13 |
| 2018/0101341 | A1* | 4/2018 | Tsuchiya | G06F 3/1234 |
| 2019/0116274 | A1* | 4/2019 | Sawaguchi | H04N 1/00315 |
| 2020/0015056 | A1* | 1/2020 | Yamada | H04W 72/56 |

FOREIGN PATENT DOCUMENTS

JP 2018-111258 A 7/2018

\* cited by examiner

*Primary Examiner* — Frantz Bataille
(74) *Attorney, Agent, or Firm* — Workman Nydegger (57) ABSTRACT

A printing apparatus includes a communication section configured to perform wireless communication with a first external device using a first communication mode and with a second external device using a second communication mode, a printing section, a storage section configured to store first communication setting information, second communication setting information related, and print setting information, a detector configured to detect a predetermined input, and a controller. The controller determines a predetermined error state, generates, when the detector detects the predetermined input, based on the second communication setting information, symbol image information, and controls the printing section to print the symbol image information. The controller controls the communication section to perform, based on the second communication setting information, to communicate with the second external device and to transmit, when a request from the second external device is received, the first communication setting information and the print setting information.

12 Claims, 8 Drawing Sheets

PRINTING APPARATUS AND METHOD OF CONTROLLING PRINTING APPARATUS

The present application is based on, and claims priority from JP Application Serial Number 2021-024014, filed on Feb. 18, 2021, the disclosure of which is hereby incorporated by reference herein in its entirety.

BACKGROUND

1. Technical Field

The present disclosure relates to a printing apparatus and a method of controlling a printing apparatus.

2. Related Art

As described in JP-A-2018-111258, a printing apparatus that prints a connection method of wireless communication has been known.

When a printing apparatus used in wireless communication becomes an error state due to a failure or the like, it is necessary to replace the printing apparatus with a new printing apparatus. In particular, a printing apparatus used for business needs to be able to operate immediately after replacement. However, the printing apparatus described in JP-A-2018-11125 does not consider operation immediately after replacement.

SUMMARY

According to an aspect of the present disclosure, a printing apparatus includes a communication section configured to perform wireless communication with a first external device using a first communication mode and to perform wireless communication with a second external device using a second communication mode different from the first communication mode, a printing section configured to print on recording paper, a storage section configured to store first communication setting information related to the first communication mode, second communication setting information related to the second communication mode, and print setting information related to the printing section, a detector configured to detect a predetermined input, and a controller configured to determine a predetermined error state, in which the controller determines the predetermined error state, generates, when the detector detects the predetermined input, based on the second communication setting information stored in the storage section, symbol image information, and controls the printing section to print the symbol image information on the recording paper, and controls the communication section to perform, based on the second communication setting information, communication with the second external device using the second communication mode and to transmit, when a request from the second external device is received, the first communication setting information and the print setting information stored in the storage section.

According to an aspect of the present disclosure, a method of controlling a printing apparatus including a communication section configured to perform wireless communication with a first external device using a first communication mode and to perform wireless communication with a second external device using a second communication mode different from the first communication mode, a printing section configured to print on recording paper, a storage section configured to store first communication setting information related to the first communication mode, second communication setting information related to the second communication mode, and print setting information related to the printing section, and a detector configured to detect a predetermined input, includes determining a predetermined error state, generating, when the detector detects the predetermined input, based on the second communication setting information stored in the storage section, symbol image information, and controlling the printing section to print the symbol image information on the recording paper, and controlling the communication section to perform, based on the second communication setting information, communication with the second external device using the second communication mode and to transmit, when a request from the second external device is received, the first communication setting information and the print setting information stored in the storage section.

DESCRIPTION OF EXEMPLARY EMBODIMENTS

1. Embodiment

A point of sales (POS) system 100 according to an embodiment is a system used for businesses including retail businesses such as shopping centers, department stores, convenience stores, and in-vehicle sales, and food and drink businesses such as restaurants, coffee shops, and bars, for example. The POS system 100 has a function of performing accounting in accordance with a product or service purchased by a customer, a function of issuing a receipt in accordance with the accounting, and the like.

Figure 1:
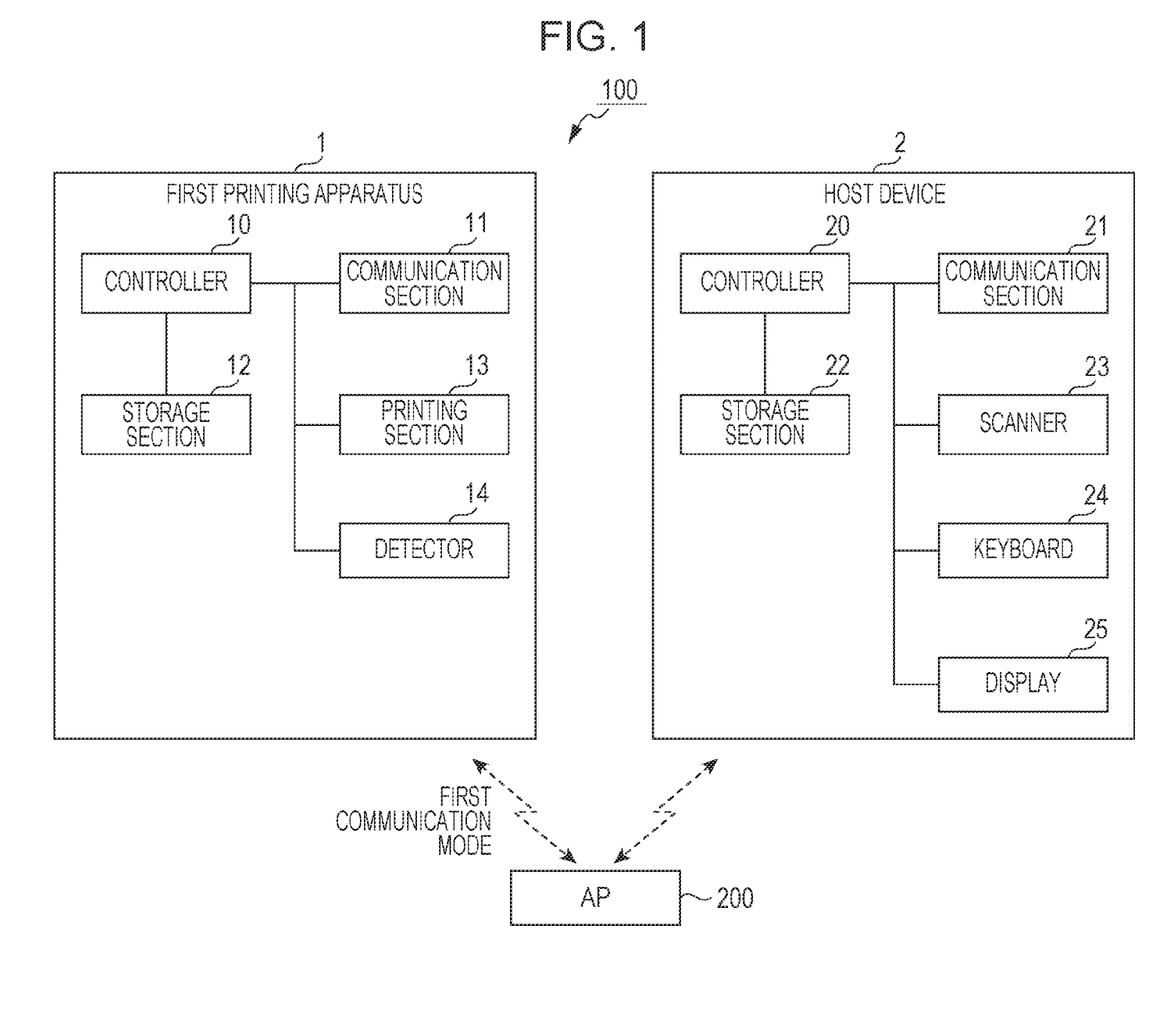
FIG. 1 is a block diagram illustrating a configuration of a POS system before a first printing apparatus is replaced.
Figure 8:
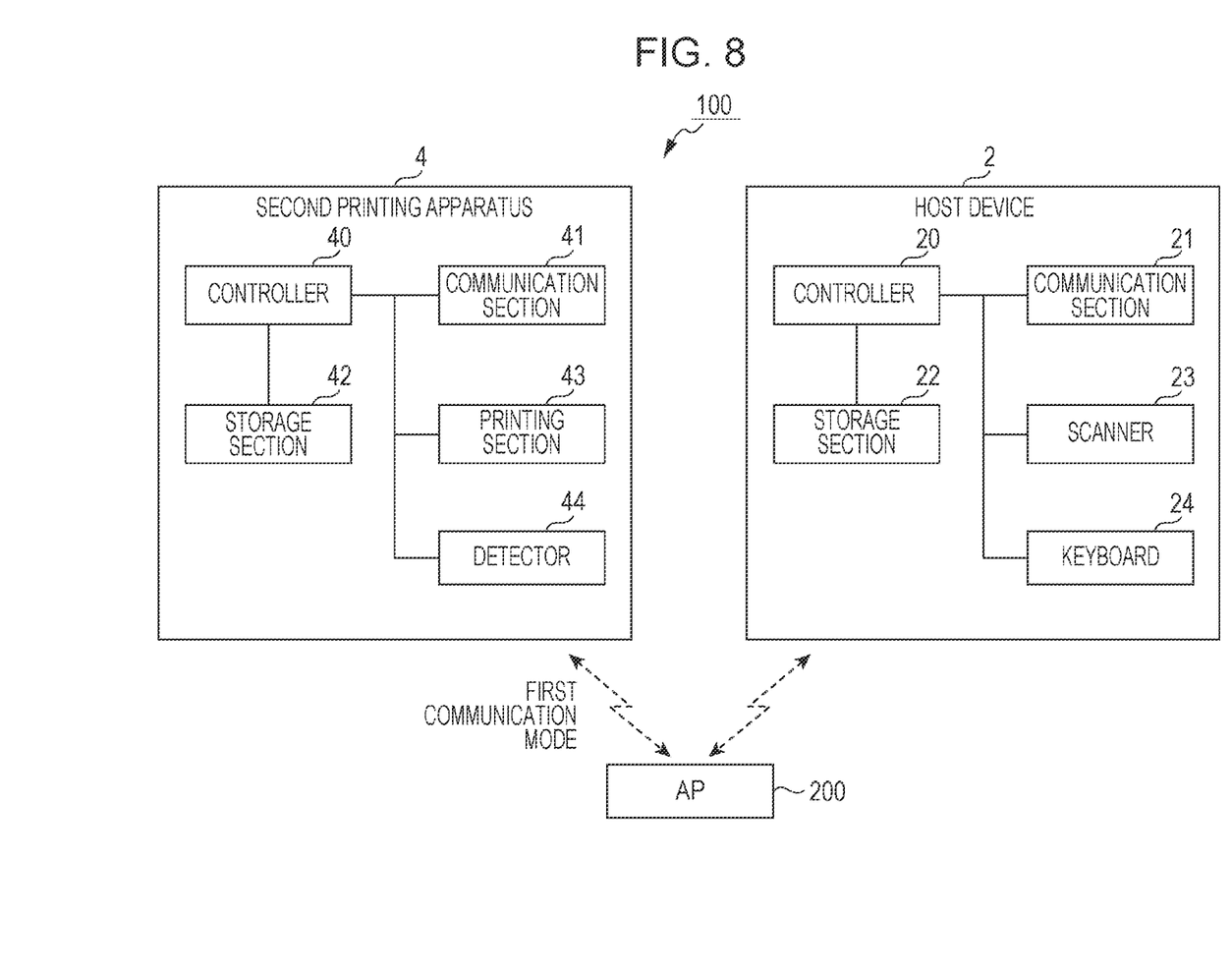
FIG. 8 is a block diagram illustrating a configuration of a POS system after replacement with the second printing apparatus.

FIG. 1 is a block diagram illustrating the configuration of the POS system 100 before a first printing apparatus 1 is replaced, and FIG. 8 is a block diagram illustrating the configuration of the POS system 100 after the first printing apparatus 1 becomes an error state and is replaced with a second printing apparatus 4, as described later.

As illustrated in FIGS. 1 and 8, the POS system 100 includes the first printing apparatus 1 or the second printing apparatus 4 as a printing apparatus and a host device 2 as a first external device. The first printing apparatus 1 or the second printing apparatus 4 and the host device 2 can perform wireless communication with each other through an access point (hereafter, referred to as an AP) 200.

1-1. First Printing Apparatus

As illustrated in FIG. 1, the first printing apparatus 1 includes a controller 10, a communication section 11, a storage section 12, a printing section 13, and a detector 14. Each of the sections will be specifically described.

The controller 10 of the first printing apparatus 1 includes a central processing unit (CPU) that performs various controls. The CPU is also referred to as a processor.

The storage section 12 is, for example, a rewritable nonvolatile memory such as a flash read only memory (ROM) and can store firmware such as a control program and predetermined information including setting information related to communication or printing. Note that the setting information related to printing includes not only information related to adjustment at the time of printing such as a paper width, but also information related to print contents such as logo data. The storage section 12 also includes a random access memory (RAM) used as a work area by the controller 10.

The controller 10 reads out and executes firmware stored in the storage section 12 and controls each section of the first printing apparatus 1. In addition, the controller 10 reads out the setting information related to communication or printing from the storage section 12 and performs communication or printing.

The controller 10 checks the communication section 11, the storage section 12, the printing section 13, and the detector 14, and determines an error state of each section. When the controller 10 determines that any of the sections is in an error state, the controller 10 controls a notification section such as an LED or a buzzer to perform notification indicating the error state or transmits status information to the host device 2.

The communication section 11 includes a circuit including a module for performing wireless local area network (LAN) communication and an antenna.

The communication section 11 can perform communication by the Wi-Fi (registered trademark) system and communication by Wi-Fi Direct (registered trademark) system. Each of the systems is a wireless communication system conforming to a group of standards of IEEE802.11 that are standards of wireless LAN.

The communication section 11 can perform communication in an infrastructure mode (hereinafter, referred to as a first communication mode) in the Wi-Fi system and in a Wi-Fi Direct simple AP mode (hereinafter, referred to as a second communication mode) in the Wi-Fi Direct system.

In the second communication mode, the communication section 11 has the function of an AP. In this case, the first printing apparatus 1 can directly perform communication with a target device without using the AP 200. In addition, it is possible to prevent erroneous connection and security vulnerability.

The storage section 12 can store a media access control (MAC) address-1 and an internet protocol (IP) address-1 of the first printing apparatus 1, information including a service set identifier (SSID)-AP, a password (security key)-AP, and certificate information of the AP 200, and the like, in a mutually associated manner. Such information can be used in the first communication mode. The storage section 12 can also store information including a SSID-1 and a password-1 of the first printing apparatus 1, and the like, in a mutually associated manner. Such information can be used in the second communication mode. Furthermore, the storage section 12 can store information identifying the first printing apparatus 1, such as the model name and the serial number of the first printing apparatus 1, in a mutually associated manner.

The controller 10 reads out at least the SSID-AP and the password-AP of the AP 200, which are first communication setting information related to the first communication mode, from the storage section 12 and controls the communication section 11 to perform communication setting related to the first communication mode, perform authentication or the like with the AP 200, and establish communication in the first communication mode.

Here, when the controller 10 also uses, for authentication, the certificate information of the AP 200 as the first communication setting information, it is possible to further improve security. In addition, when the IP address-1 and the MAC address-1 are associated as the first communication setting information, it is possible to further improve security.

After the communication is established, the controller 10 controls the communication section 11 to enable communication with the host device 2 in the first communication mode through the AP 200.

The controller 10 controls the communication section 11 to perform predetermined encryption and decryption on data to be transmitted and received, thereby improving security.

In the first communication mode, when the communication section 11 receives the IP address-1 from the host device 2 through the AP 200, the controller 10 compares the received IP address-1 with the IP address-1 stored in the storage section 12. When both IP addresses match each other, it is possible to establish connection with the host device 2.

Thereafter, the controller 10 controls the communication section 11 to receive print data, a command, or the like from the host device 2, thereby enabling processing such as printing.

Meanwhile, the controller 10 reads out at least the SSID-1 and the password-1 of the first printing apparatus 1, which are second communication setting information related to the second communication mode, from the storage section 12 and controls the communication section 11 to perform communication setting related to the second communication mode in which the communication section 11 functions as an AP. The controller 10 controls the communication section 11 to perform authentication or the like with a terminal device 3 and establish communication in the second communication mode. After the communication is established, the controller 10 controls the communication section 11 to enable direct communication with the terminal device 3 in the second communication mode without using the AP 200.

Also with respect to security and connection, the controller 10 can perform the same control as in the first communication mode.

The printing section 13 includes printing mechanisms such as a head, a transport mechanism, and a cutter. The head is, for example, a line thermal head. The line thermal head includes a plurality of heating elements arranged in a line. Recording paper is thermal paper wound in a roll shape. The transport mechanism pulls out thermal paper wound in a roll shape and transports the thermal paper. The line thermal head applies heat to thermal paper transported by the transport mechanism to print characters and images on the thermal paper. The cutter cuts the printed thermal paper. A cut piece of the thermal paper is issued as a receipt.

The storage section 12 stores print setting information related to the printing section 13, such as setting of the paper width of thermal paper and registered logo data, for example. The controller 10 reads out the print setting information from the storage section 12 and performs print setting. The controller 10 controls the printing section 13 based on the print setting to print print data on the recording paper within the set paper width, print logo data such as a store name, and print the data as a predetermined receipt.

The detector 14 includes, for example, a paper feed switch, a cover opening/closing detector, or the like that detects a predetermined input by a user operation.

When the paper feed switch detects an input, the controller 10 controls the transport mechanism of the printing section 13 to transport the recording paper.

A cover covers the printing section 13. When the user opens the cover, the cover opening/closing detector detects an input indicating that the user has opened the cover, and the controller 10 stops or prohibits the operation of the printing section 13. When the user opens the cover, the controller 10 prevents the user from touching the operating printing section 13.

Further, the detector 14 may be a sensor such as a near-end sensor that detects the remaining amount of thermal paper wound in a roll shape. The near-end sensor is configured to detect a diameter of the roll in which the thermal paper is wound and detect the remaining amount.

The detector 14 may be another switch or sensor operable by the user.

1-2. Host Device

The host device 2 illustrated in FIG. 1 is the first external device for settlement processing in the POS system 100. The first external device can perform communication with the first printing apparatus 1 in the first communication mode through the AP 200. The host device 2 is also a printing control device that controls the first printing apparatus 1 to issue a receipt.

As illustrated in FIG. 1, the host device 2 includes a controller 20, a communication section 21, a storage section 22, a scanner 23, a keyboard 24, and a display 25. Each of the sections will be specifically described.

The controller 20 of the host device 2 includes a CPU that performs various controls. The CPU is also referred to as a processor.

The storage section 22 is a rewritable nonvolatile memory such as a flash ROM, for example, and stores an operating system (OS), an application programming interface (API), a driver, and an application program.

The controller 20 reads out and executes the OS, the API, the driver, and the application program stored in the storage section 22 to control each section of the host device 2. The storage section 22 also includes a RAM used as a work area by the controller 20.

The storage section 22 can store setting information related to communication in the first communication mode, such as a MAC-address-H and an IP address-H of the host device 2 and the IP address-1 and the MAC-address-1 of the first printing apparatus 1, in a mutually associated manner. In addition, the storage section 22 can store setting information related to communication in the first communication mode, such as the SSID-AP, the password-AP, and the certificate information of the AP 200, in a mutually associated manner.

The controller 20 reads out at least the SSID-AP and the password-AP of the AP 200 from the storage section 22 and controls the communication section 21 to perform communication setting related to the first communication mode, perform authentication or the like with the AP 200, and establish communication in the first communication mode.

Here, when the controller 20 also uses, for authentication, the certificate information of the AP 200, it is possible to further improve security. In addition, when the IP address-H and the MAC address-H are associated, it is possible to further improve security.

The controller 20 controls the communication section 21 to perform communication setting and enable communication with the first printing apparatus 1 through the AP 200 in the first communication mode.

Note that the controller 20 controls the communication section 21 to perform predetermined encryption and decryption on data to be transmitted and received, thereby improving security.

The controller 20 reads out and executes an application program for settlement processing stored in the storage section 22. The scanner 23 reads out bar code information of a product to be purchased by a customer. The controller 20 acquires product information based on the bar code information and controls the display 25 to display the product information. The user inputs the amount of money received from the customer through the keyboard 24. The controller 20 performs settlement processing such as calculation of the total amount and generates settlement information.

The controller 20 generates print data for a receipt based on the settlement information. Here, the print data may be generated by reading out and executing a provided API or driver from the storage section 22.

The controller 20 controls the communication section 21 to transmit, through the AP 200, the IP address-1 read out from the storage section 22 to the first printing apparatus 10 using the first communication mode. The first printing apparatus 1 can establish connection with the host device 2.

After that, the controller 20 controls the communication section 21 to transmit print data, a command, or the like to the first printing apparatus 1 and causes the first printing apparatus 1 to perform processing such as printing.

1-3. Error State of First Printing Apparatus

The controller 10 of the first printing apparatus 1 checks the states of the communication section 11, the storage section 12, the printing section 13, and the detector 14. When the controller 10 determines that any of the sections is in a predetermined error state, the controller 10 controls a notification section such as an LED or a display to perform notification indicating the predetermined error state or controls the communication section 11 to transmit status information indicating the predetermined error state to the host device 2.

The notification section of the first printing apparatus 1 performs notification indicating the error state or the controller 20 of the host device 2 controls the display 25 to display the error state based on the status information, for example, whereby the user can recognize the predetermined error state of the first printing apparatus 1.

Here, the controller 10 may read out the model name and the serial number of the first printing apparatus 1 from the storage section 12 and control the notification section to perform notification. Alternatively, the controller 10 may transmit such information in addition to the status information so that the controller 20 of the host device 2 controls the display 25 to display the information. The user can prepare the second printing apparatus 4 of the same type by referring to the model name and the serial number of the first printing apparatus 1.

The following will specifically describe, with several examples, the determination of the predetermined error state by the controller 10. First, an example of a cutter of the printing section 13 will be described. The cutter is configured such that the movable blade moves toward the fixed blade so as to cut the recording paper between the movable blade and the fixed blade. The cutter includes a motor for moving the movable blade and a sensor for detecting the movement of the movable blade.

In a case in which the movement of the movable blade cannot be detected by the sensor even when an attempt is made to move the movable blade by the motor, the controller 10 determines that there is an error state in which the movable blade cannot be moved.

Examples of the determination of the predetermined error state include the followings. When the radio wave intensity of the communication section 11 is equal to or less than a predetermined value, the controller 10 determines that the communication is in an error state. When a value written to the address of a part of the RAM of the storage section 12 is different from a value read out therefrom, the controller 10 determines that a part of the RAM is in an error state. In a case in which the near-end sensor that detects the remaining amount of the thermal paper does not change even when the thermal paper of a predetermined length is consumed, the controller 10 determines that the near-end sensor is in an error state.

Even in these error states, the printing section 13 can perform printing on the recording paper.

When it is determined that the predetermined error state is occurred, the controller 10 can read out information including the second communication setting information related to the second communication mode from the storage section 12, encode the information into a barcode, a two dimensional code, or the like to generate symbol image information, and control the printing section 13 to print a symbol image on the recording paper.

Figure 2:
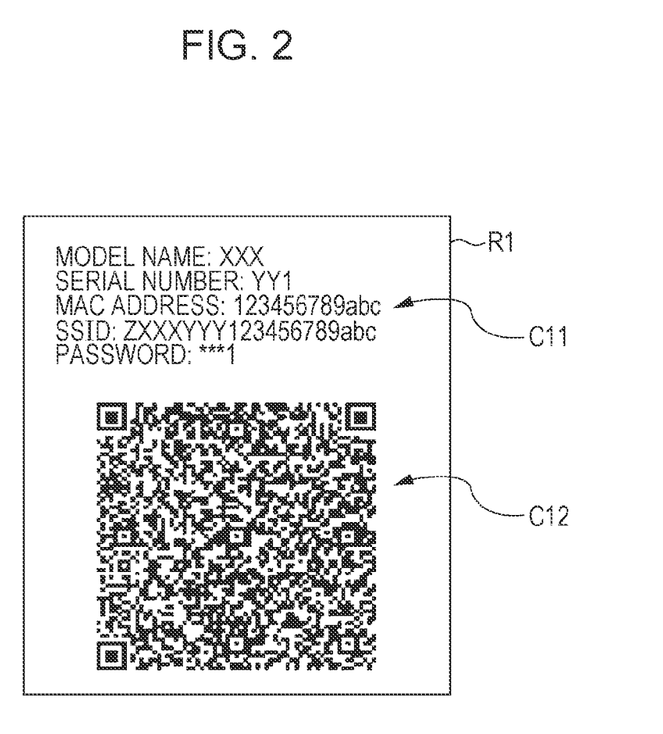
FIG. 2 is a diagram illustrating a printed matter printed by the first printing apparatus.

FIG. 2 illustrates a printed matter R1 as an example of the printed matter on which the symbol image is printed by the printing section 13. In this example, a symbol image C12 is a two dimensional code.

The controller 10 may control the printing section 13 to print information including the second communication setting information as characters together with the symbol image. In this example, in addition to the SSID-1 and the password-1 of the first printing apparatus 1 related to the second communication setting information, the MAC-address-1 of the first printing apparatus 1 and the model name and the serial number of the first printing apparatus 1 are also printed as characters C11 by the printing section 13.

In the error state, the printing section 13 prints the symbol image and the characters. Thus, the first printing apparatus 1 may not include a display section such as a display.

1-4. Terminal Device

Figure 3:
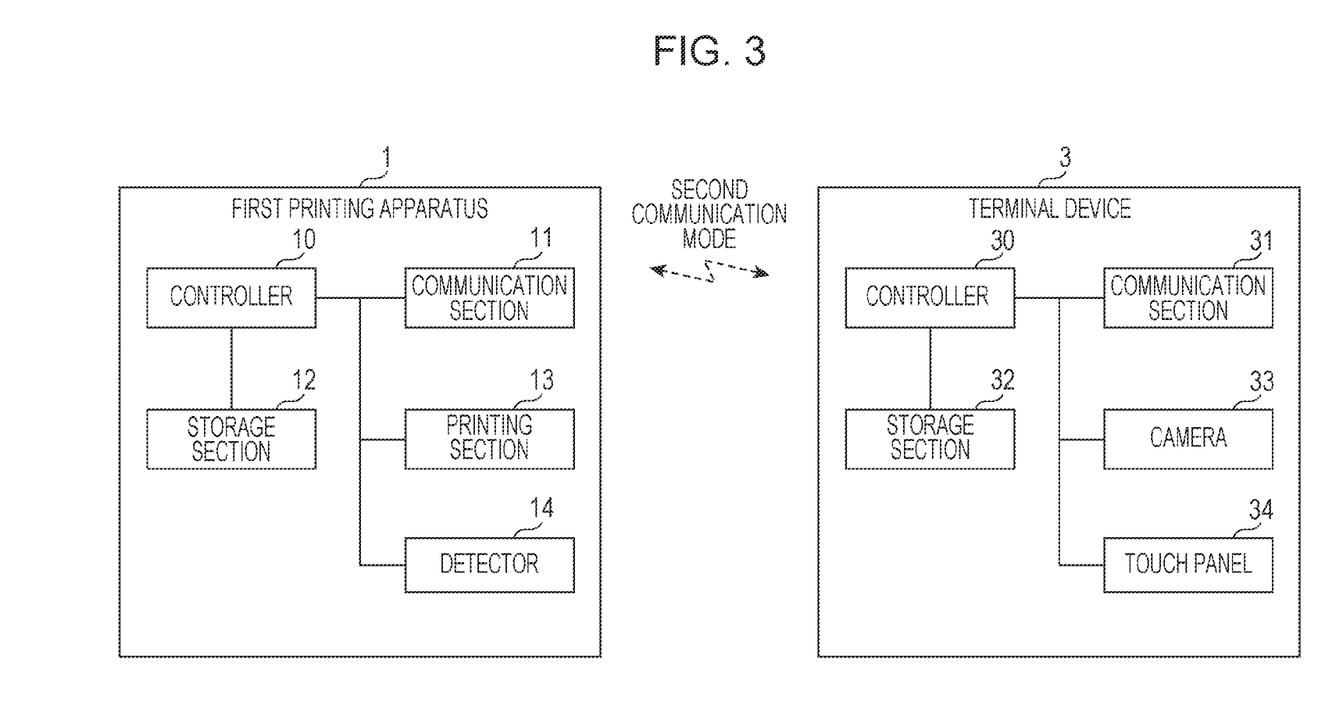
FIG. 3 is a block diagram illustrating a configuration when information is backed up from the first printing apparatus to a terminal device.

When the first printing apparatus 1 becomes an error state, the controller 10 of the first printing apparatus 1 reads out at least predetermined information including various types of setting information stored in the storage section 22 such as the first communication setting information related to the first communication mode and the print setting information related to the printing section 13 and controls the communication section 11 to transmit the information to the terminal device 3 in the second communication mode so that the terminal device 3 backs up the information. Then, the terminal device 3 transmits, in the second communication mode, the backed up predetermined information to the second printing apparatus 4 having replaced the first printing apparatus 1 so that the information is restored in the second printing apparatus 4. The terminal device 3 is a second external device and is, for example, a portable terminal such as a tablet.

As illustrated in FIG. 3, the terminal device 3 includes a controller 30, a communication section 31, a storage section 32, a camera 33, and a touch panel 34. Each of the sections will be specifically described.

The controller 30 of the terminal device 3 includes a CPU that performs various controls. The CPU is also referred to as a processor.

The storage section 22 is a rewritable non-volatile memory such as a flash ROM and stores an OS, an application program, and a utility program.

The controller 30 reads out and executes the OS, the application program, and the utility program stored in the storage section 32 and controls each section of the terminal device 3. The storage section 32 also includes a RAM used as a work area by the controller 30.

Examples of the utility program includes a program that causes the controller 30 to receive predetermined information stored in the storage section 12 of the first printing apparatus 1 to back up the predetermined information in the storage section 32 and transmit the backed up predetermined information to the second printing apparatus 4 having replaced the first printing apparatus 1 to restore the predetermined information.

The camera 33 reads the symbol image C12 from the printed matter R1 printed on the recording paper by the first printing apparatus 1. The controller 20 acquires information by decoding the symbol image C12 read by the camera 33. The acquired information includes predetermined information such as the second communication setting information related to the second communication mode and is stored in the storage section 32 in a mutually associated manner.

The touch panel 34 displays, for example, a menu of a utility program and detects a user input based on the display. For example, based on the execution of a utility program by the controller 20, the touch panel 34 displays, to the user, a measure taken when the first printing apparatus 1 becomes the predetermined error state, a measure taken to back up information including each setting information of the first printing apparatus 1, a measure taken to back up information into the second printing apparatus 4 after replacement, and the like and detects a user input.

Under the control of the controller 30, the communication section 31 performs communication setting in the second communication mode in which the communication section 11 functions as an AP, based on the second communication setting information included in the symbol image C12 read by the camera 33. The controller 30 reads out at least the password-1 of the first printing apparatus 1 from the storage section 32 and controls the communication section 31 to transmit the password-1 to the first printing apparatus 1.

The first printing apparatus 1 performs authentication or the like with reference to the storage section 12 based on the received password-1 and establishes communication in the second communication mode. After the communication is established, the controller 30 controls the communication section 31 to directly perform communication with the first printing apparatus 1 in the second communication mode without using the AP 200.

1-5. Second Printing Apparatus

Figure 4:
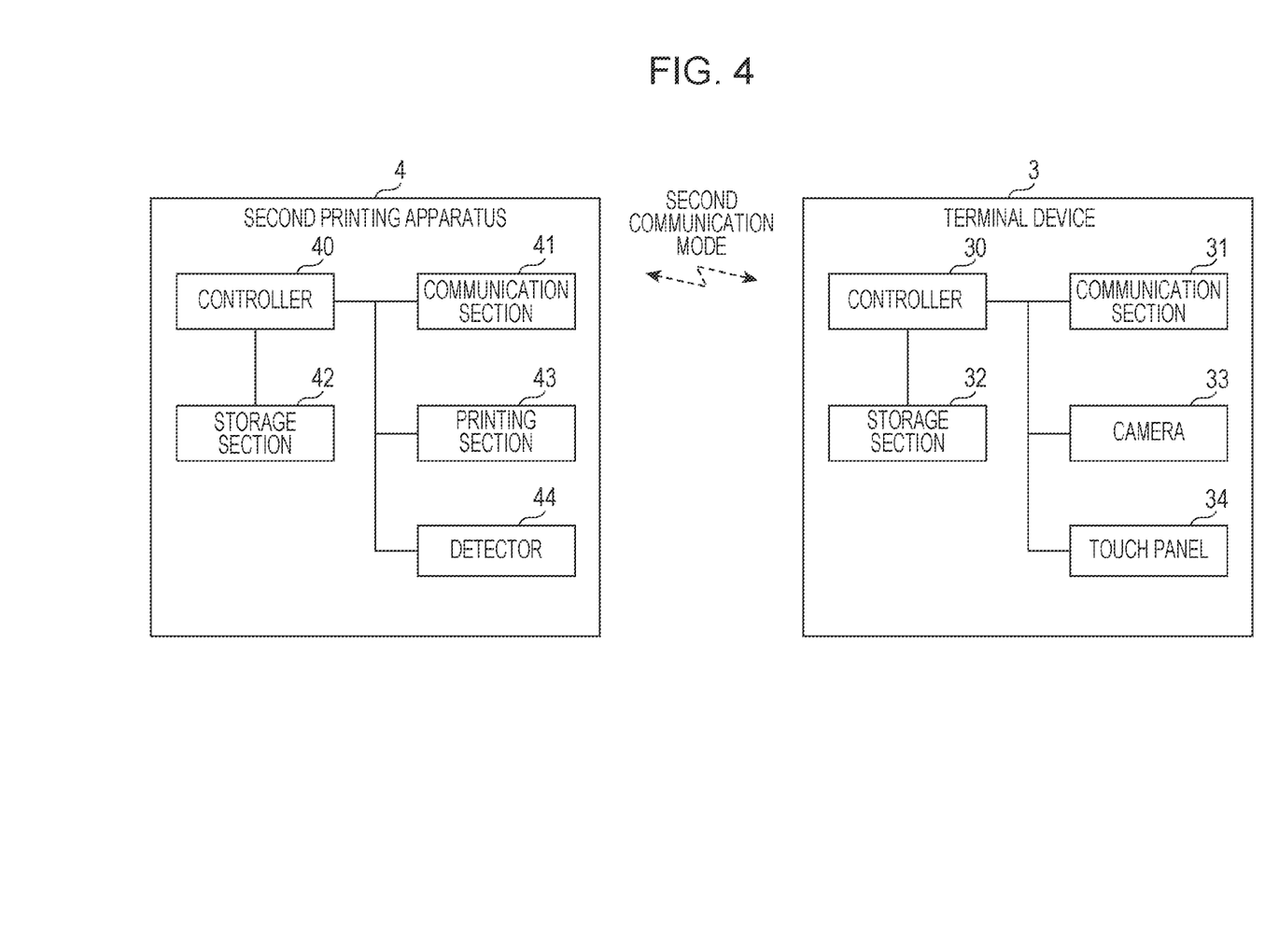
FIG. 4 is a block diagram illustrating a configuration when information is restored from the terminal device to a second printing apparatus.

As illustrated in FIG. 4, the second printing apparatus 4 is a printing apparatus having the same configuration as the first printing apparatus 1. The second printing apparatus 4 includes a controller 40, a communication section 41, a storage section 42, a printing section 43, and a detector 44, which are similar to those of the first printing apparatus 1.

The storage section 42 can store information including second communication setting information such as an SSID-2 and a password-2 of the second printing apparatus 4. Such information can be used in the second communication mode. Further, the storage section 42 can also store the model name and the serial number of the second printing apparatus 4. Note that the SSID-2 and the password-2 may be the same as the SSID-1 and the password-1, respectively.

As illustrated in FIG. 4, the terminal device 3 can also set the second communication mode to the second printing apparatus 4 having replaced the first printing apparatus 1 so as to enable direct communication, similarly to the case of the first printing apparatus 1.

Figure 5:
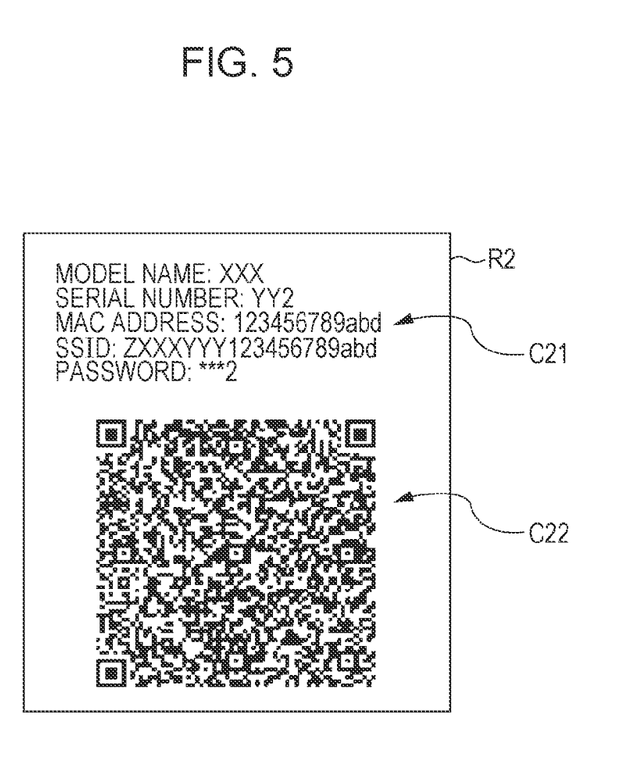
FIG. 5 is a diagram illustrating a printed matter printed by the second printing apparatus.

FIG. 5 illustrates a printed matter R2 on which a symbol image C22 is printed by the second printing apparatus 4. In addition to the SSID-2 and the password-2 of the second printing apparatus 4 related to the second communication setting information, a MAC-address-2 of the second printing apparatus 4 and the model name and the serial number of the second printing apparatus 4 are also printed as characters C21 on the recording paper by the printing section 43. Similarly to the printed matter R1, the printed matter R2 includes information such as the second communication setting information related to the second communication mode.

The terminal device 3 can also read the symbol image C22 of the printed matter R2 illustrated in FIG. 5 and set the second communication mode to the second printing apparatus 4 so as to enable communication, similarly to the case of the first printing apparatus 1.

The storage section 42 of the second printing apparatus 4 stores an initial value in an initial state such as the time of factory shipment. The initial value also includes contents of printing the printed matter R2 by the printing section 43 at the time of power-on or restart. The controller 40 is configured to read out, at the time of power-on or restart, the initial value from the storage section 42 and control the printing section 43 to print information including the second communication setting information as the printed matter R2. In the initial state, the storage section 42 does not store at least part of the first communication setting information and the print setting information.

The controller 30 of the terminal device 3 illustrated in FIG. 4 executes a utility program and controls the communication section 31 to request, in the second communication mode, the first printing apparatus 1 to transmit predetermined information including the first communication setting information and the print setting information. Upon receiving the request, the first printing apparatus 1 reads out the predetermined information from the storage section 12 and transmits the information to the terminal device 3 in the second communication mode through the communication section 11. The transmission request is made by a predetermined command.

The terminal device 3 can store and back up the received predetermined information in the storage section 32.

Further, as illustrated in FIG. 4, the terminal device 3 can directly transmit predetermined information stored in the storage section 32 to the second printing apparatus 4 having replaced the first printing apparatus 1 in the second communication mode without using the AP 200, so that the storage section 42 of the second printing apparatus 4 stores and restores the predetermined information.

When the power of the second printing apparatus 4 is turned on or a restart is performed after the predetermined information is stored in the storage section 42, the controller 40 of the second printing apparatus 4 controls the communication section 41 to enable communication with the host device 2 in the first communication mode, based on the first communication setting information included in the predetermined information stored in the storage section 42, and performs print setting related to the printing section 43 based on the print setting information included in the predetermined information stored in the storage section 42.

As a result, the second printing apparatus 4 after replacement can perform the same operation as the first printing apparatus 1 before the error state.

1-6. Backup from First Printing Apparatus to Terminal Device

Figure 6:
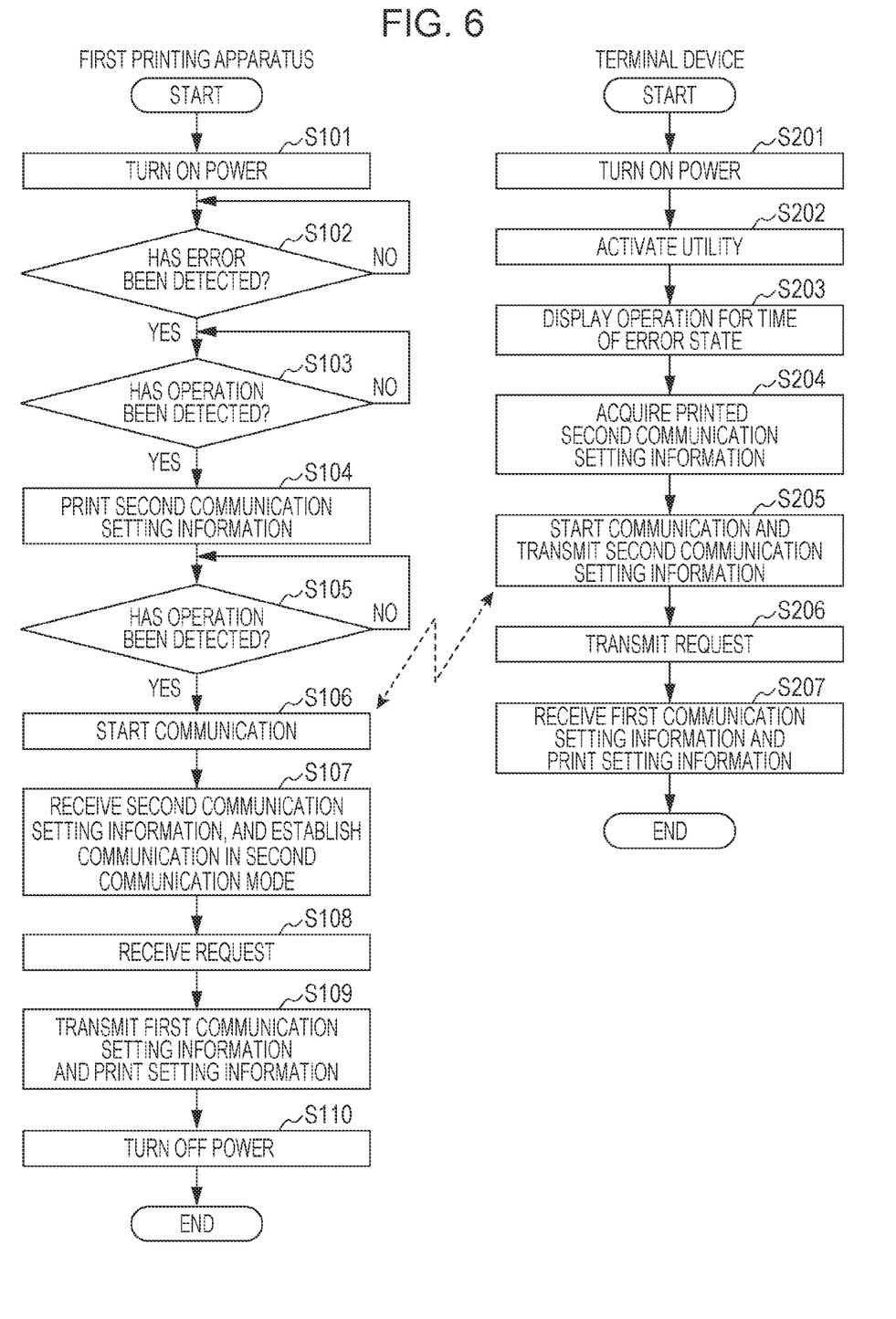
FIG. 6 is a flowchart illustrating a control performed when information is backed up from the first printing apparatus to the terminal device.

The following will describe controls performed by the first printing apparatus 1 and the terminal device 3 to back up, in the terminal device 3, predetermined information including the first communication setting information and the print setting information stored in the storage section 12 of the first printing apparatus 1 when the first printing apparatus 1 becomes an error state, with reference to the flowchart illustrated in FIG. 6.

It is supposed that before becoming the error state, the first printing apparatus 1 normally performs communication with the host device 2 in the first communication mode through the AP 200, receives print data from the host device 2, and normally operates to issue a regular receipt.

First, the control performed by the first printing apparatus 1 will be described. The power switch of the first printing apparatus 1 is operated by the user, and the power is turned on (S101). In this case, the first printing apparatus 1 may be restarted by operation of a reset switch of the first printing apparatus 1.

The controller 10 reads out firmware from the storage section 12 to start control, checks each of the communication section 11, the storage section 12, the printing section 13, and the detector 14, and determines whether any of the sections is in an error state (S102). When it is determined that no section is in an error state (NO at S102), the controller 10 continues to check each section while waiting for reception of print data or a command from the host device 2. When it is determined that no section is in an error state, the controller 10 perform each processing upon receiving print data or a command.

When it is determined that any of the sections is in a predetermined error state (YES at S102), the controller 10 controls the detector 14 to detect a predetermined operation in order to detect a predetermined input by the user (S103). In this case, the controller 10 may control a notification section to perform notification indicating the error state or may transmit the notification indicating the error state to the host device 2. The detector 14 is, for example, the paper feed switch. The notification section or display of the host device 2 allows the user to recognize the error state and press the paper feed switch. The controller 10 waits until the detector 14 detects a predetermined operation (NO at S103).

When the detector 14 detects the predetermined operation (YES at S103), the controller 10 determines that the predetermined input by the user has been detected, encodes information including the second communication setting information related to the second communication mode to generate symbol image information, and controls the printing section 13 to print, on the recording paper, the information including the second communication setting information as the printed matter R1 including the symbol image C12 (S104).

As a result, the terminal device 3 can easily acquire, using the camera 33, the information including the second communication setting information, and the user does not need to input characters or the like through the touch panel 34.

After the symbol image C12 is printed, the controller 10 controls the detector 14 to detect a predetermined operation in order to detect a predetermined input by the user (S105).

Upon visually recognizing the printed matter R1 on which the symbol image C12 is printed by the first printing apparatus 1, the user operates the detector 14. In this case, the detector 14 is, for example, the cover opening/closing detector. The first printing apparatus 1 may print, on the printed matter R1, a procedure of an operation, backup, or the like that needs to be performed by the user. The printed matter R1 by the first printing apparatus 1 allows the user to recognize an operation or a procedure to be performed on the first printing apparatus 1 and open/close the cover. The controller 10 waits until the cover opening/closing detector detects the predetermined operation (NO at S105).

When the cover opening/closing detector serving as the detector 14 detects the predetermined operation (YES at S105), the controller 10 determines that the predetermined input by the user has been detected, reads out the second communication setting information from the storage section 12 to control the communication section 11, and activates the communication setting in the second communication mode to start communication (S106). The controller 10 controls the communication section 11 to transmit, for example, information of the SSID-1 as the second communication setting information on a beacon signal.

Upon receiving, for example, a password from the terminal device 3 as the second communication setting information used for authentication in the second communication mode, the controller 10 compares the received password with the password-1 corresponding to the SSID-1 stored in the storage section 12 and performs authentication by determining whether the passwords match each other. When it is determined that the password received from the terminal device 3 matches the password-1 and the authentication is successful, the controller 10 controls the communication section 11 to function as an AP and establish communication with the terminal device 3 in the second communication mode (S107). After the communication is established, the controller 10 controls the communication section 11 to enable direct communication with the terminal device 3 in the second communication mode without using the AP 200.

As described above, the detector 14 can use, for example, the paper feed switch as a first detector and the cover opening/closing detector different from the paper feed switch as a second detector.

When a predetermined error state is detected and an input of a pressing operation as a first input is detected by the paper feed switch, the controller 10 generates symbol image information and controls the printing section 13 to print the symbol image information on the recording paper. When an input of a cover opening/closing operation as a second input is detected by the cover opening/closing detector, the controller 10 controls the communication section 11 to perform communication with the terminal device 3 using the second communication mode.

When the user operates different detectors 14 as the first input and the second input, it is possible to correctly perform processing in accordance with the procedure. The controller 10 may use the same detector 14 as the first input and the second input.

The terminal device 3 requests, in the second communication mode, the first printing apparatus 1 to transmit predetermined information including setting information such as the first communication setting information and the print setting information. When the communication section 11 receives this request in the second communication mode (S108), the controller 10 reads out the predetermined information of the first printing apparatus 1 including setting information such as the first communication setting information and the print setting information from the storage section 12 and controls the communication section 11 to transmit the information to the terminal device 3 in the second communication mode (S109). The transmission request is made by a predetermined command.

The power switch of the first printing apparatus 1 is operated by the user, whereby the power is turned off (S110), and the first printing apparatus 1 ends the control.

Thereafter, the user removes and replaces the first printing apparatus 1 in the error state with the new second printing apparatus 4.

Next, the control performed by the terminal device 3 will be described. The power switch of the terminal device 3 is operated by the user, and the power is turned on (S201). In this case, the terminal device 3 may be restarted by operation of a reset switch of the terminal device 3.

The controller 30 of the terminal device 3 reads out and activates a utility program stored in the storage section 32 (S202).

The touch panel 34 displays a menu or the like and displays, based on a user input, an operation procedure or the like necessary when the first printing apparatus 1 becomes a predetermined error state (S203).

The camera 33 reads the symbol image C12 from the printed matter R1 printed on the recording paper by the first printing apparatus 1. The controller 30 acquires information by decoding the symbol image C12 read by the camera 33. The acquired information includes the second communication setting information that is communication information related to the second communication mode and is stored in the storage section 32. In this manner, the terminal device 3 can easily acquire the second communication setting information printed on the recording paper by the first printing apparatus 1 (S204).

The controller 30 controls the communication section 31 based on the acquired second communication setting information to activate the communication setting related to the second communication mode in which the communication section 11 functions as an AP and start communication (S205).

The communication section 31 performs broadcast and receives, for example, the information of the SSID-1 of the first printing apparatus 1 from a beacon signal transmitted by the first printing apparatus 1. The controller 30 reads out, for example, the password-1 corresponding to the SSID-1 as the second communication setting information from the storage section 32 and displays the SSID-1 and the password-1 on the touch panel 34. The user confirms the SSID-1 and the password-1 displayed on the touch panel 34 and inputs an instruction for the next step.

The controller 30 may allow the user to input or select the SSID-1 on the touch panel 34.

Upon detecting an input on the touch panel 34, the controller 30 controls the communication section 31 to transmit, for example, the password-1 to the first printing apparatus 1 as the second communication setting information used for authentication by the first printing apparatus 1. When the authentication by the first printing apparatus 1 is successful with the transmitted password-1, it becomes possible to perform direct communication with the communication section 11 in the second communication mode in which the communication section 11 functions as an AP.

The controller 30 controls the communication section 31 to transmit a request for transmission of predetermined information of the first printing apparatus 1 including setting information such as the first communication setting information and the print setting information to the first printing apparatus 1 (S206). When the communication section 31 receives the predetermined information of the first printing apparatus 1 including setting information such as the first communication setting information and the print setting information from the first printing apparatus 1 having received the request (S207), the storage section 32 stores the information in a mutually associated manner and the controller 30 ends the control.

In this manner, when the first printing apparatus 1 becomes an error state, the predetermined information including the first communication setting information and the print setting information stored in the storage section 12 of the first printing apparatus 1 is backed up in the storage section 32 of the terminal device 3.

1-7. Restore to Second Printing Apparatus

Figure 7:
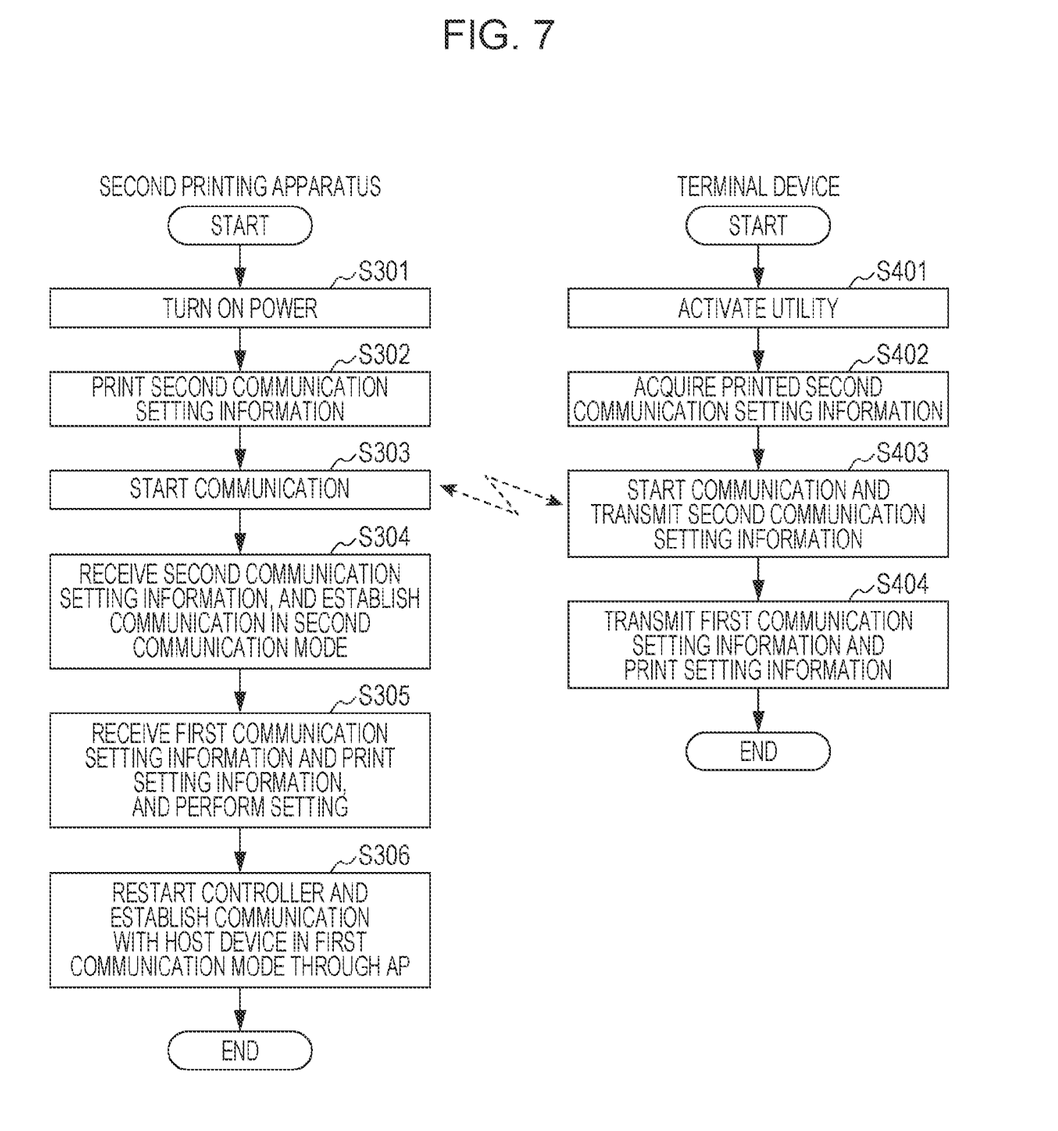
FIG. 7 is a flowchart illustrating a control performed when information is restored from the terminal device to the second printing apparatus.

The following will describe the controls performed by the terminal device 3 and the second printing apparatus 4 to restore, to the second printing apparatus 4, predetermined information including the first communication setting information and the print setting information of the first printing apparatus 1 backed up in the storage section 32 of the terminal device 3, with reference to the flowchart illustrated in FIG. 7.

It is assumed that the second printing apparatus 4 is in an initial state at the time of factory shipment and the storage section 42 stores an initial value. The initial value includes contents for instructing printing of the printed matter R2. The initial value does not include at least part of predetermined information including the first communication setting information and the print setting information.

First, the control performed by the second printing apparatus 4 will be described. The power switch of the second printing apparatus 4 is operated by the user, and the power is turned on (S301). In this case, the second printing apparatus 4 may be restarted by operation of a reset switch of the second printing apparatus 4. The controller 40 reads out firmware from the storage section 42 and starts control.

After the power is turned on, the controller 40 encodes, based on the initial value stored in the storage section 42, information including the second communication setting information related to the second communication mode to generate symbol image information and controls the printing section 43 to print the printed matter R2 including the symbol image C22 on the recording paper, as illustrated in FIG. 5 (S302).

As a result, the terminal device 3 can easily acquire, using the camera 33, the information including the second communication setting information, and the user does not need to perform any input through the touch panel 34.

When the printing section 43 prints the information including the second communication setting information, the controller 40 reads out the second communication setting information from the storage section 42 and controls the communication section 41 to activate the communication setting related to the second communication mode and start communication (S303). The controller 40 controls the communication section 41 to transmit, for example, information of the SSID-2 as the second communication setting information on a beacon signal. After the power is turned on, the second printing apparatus 4 automatically performs these controls.

Upon receiving, for example, a password from the terminal device 3 as the second communication setting information used for authentication, the controller 40 compares the received password with the password-2 corresponding to the SSID-2 stored in the storage section 42 and performs authentication by determining whether the passwords match each other. When it is determined by the controller 40 that the password received from the terminal device 3 matches the password-2 and authentication is successful, communication is established with the terminal device 3 in the second communication mode in which the communication section 41 functions as an AP (S304). After the communication is established, the controller 40 controls the communication section 41 to enable direct communication with the terminal device 3 in the second communication mode without using the AP 200.

When the communication section 41 receives, from the terminal device 3, predetermined information of the first printing apparatus 1 including setting information such as the first communication setting information and the print setting information, the storage section 42 stores the predetermined information in a mutually associated manner and the controller 40 performs setting related to the communication section 41 (S305). The second printing apparatus 4 may preliminarily request the terminal device 3 to transmit the predetermined information. The transmission request is made by a predetermined command.

Similarly to the storage section 12 of the first printing apparatus 1, the storage section 42 stores information including at least the IP address-1 of the first printing apparatus 1 and the SSID-AP, the password-AP, and the certificate information of the AP 200, which can be used in the first communication mode, in a mutually associated manner, and the controller 40 performs setting of communication related to the communication section 41.

The storage section 42 can also store information identifying the second printing apparatus 4, such as a MAC address-2, the model name, and the serial number of the second printing apparatus 4, in a mutually associated manner.

Next, the controller 40 automatically resets the controller 40 itself for restart (S306). In this case, the user may turn on the power switch of the second printing apparatus 4 again.

The controller 40 reads out at least the SSID-AP and the password-AP of the AP 200, which are first communication setting information related to the first communication mode, from the storage section 42 and controls the communication section 41 to perform communication setting related to the first communication mode, receive a beacon signal of the AP 200, and perform authentication or the like with the AP 200 to establish communication in the first communication mode (S306).

Here, the controller 40 also uses, for authentication, the certificate information of the AP 200 as the first communication setting information and associates the IP-address-1 with the MAC-address-1 as the first communication setting information, whereby further improving security.

After the communication is established, the controller 40 controls the communication section 41 to enable communication with the host device 2 in the first communication mode through the AP 200 and ends the control of restoring to the second printing apparatus 4.

The second printing apparatus 4 can receive print data or commands from the host device 2 and print a receipt reflecting the paper width and logo data set for printing by the printing section 43, similarly to the first printing apparatus 1 before the error state.

Note that the controller 40 controls the communication section 41 to perform predetermined encryption and decryption on data to be transmitted and received, thereby improving security.

Next, the control performed by the terminal device 3 will be described. The power switch of the terminal device 3 is operated by the user, and the power is turned on. In this case, the terminal device 3 may be restarted by operation of the reset switch of the terminal device 3.

The controller 30 of the terminal device 3 reads out and activates a utility program stored in the storage section 32 (S401). The touch panel 34 displays a menu or the like and displays, based on a user input, an operation procedure of restoring to the second printing apparatus 4, or the like.

The camera 33 reads the symbol image C22 from the printed matter R2 printed on the recording paper by the second printing apparatus 4. The controller 30 acquires information by decoding the symbol image C22 read by the camera 33. The acquired information includes second communication setting information that is communication information related to the second communication mode and is stored in the storage section 32. In this manner, the terminal device 3 can easily acquire the communication information from the printed matter R2 printed on the recording paper by the second printing apparatus 4 (S402).

The controller 30 controls the communication section 31 based on the acquired second communication setting information to activate the communication setting related to the second communication mode in which the communication section 41 functions as an AP and start communication (S403). The communication section 31 performs broadcast and receives, for example, the information of the SSID-2 of the second printing apparatus 4 from a beacon signal transmitted by the second printing apparatus 4. The controller 30 reads out, for example, the password-2 corresponding to the SSID-2 as the second communication setting information from the storage section 32 and controls the touch panel 34 to display the SSID-2 and the password-2. The user confirms the SSID-2 and the password-2 displayed on the touch panel 34 and inputs an instruction for the next step.

The controller 30 may allow the user to input or select the SSID-2 on the touch panel 34.

Upon detecting the input on the touch panel 34, the controller 30 controls the communication section 31 to transmit, for example, the password-2 to the second printing apparatus 4 as the second communication setting information used for authentication by the second printing apparatus 4 (S403). When the authentication by the second printing apparatus 4 is successful with the transmitted password-2, it becomes possible to perform direct communication with the second printing apparatus 4 in the second communication mode in which the communication section 41 functions as an AP.

The controller 30 reads out the predetermined information of the first printing apparatus 1 including setting information such as the first communication setting information and the print setting information from the storage section 32 and controls the communication section 31 to transmit the predetermined information to the second printing apparatus 4 in the second communication mode (S404). The second printing apparatus 4 may preliminarily request the terminal device 3 to transmit the predetermined information, and the predetermined information may be transmitted in response to the request. After the transmission, the controller 30 ends the control.

1-8. POS System after Replacement with Second Printing Apparatus

FIG. 8 is a block diagram illustrating the configuration of the POS system 100 after replacement of the first printing apparatus 1 in the error state with the second printing apparatus 4.

By the above-described restoration control, the storage section 42 of the second printing apparatus 4 stores information including setting information such as the first communication setting information and the print setting information stored in the storage section 12 of the first printing apparatus 1 before replacement, similarly to the first printing apparatus 1. Therefore, the controller 40 of the second printing apparatus 4 can read out such information from the storage section 42 and control each section, whereby the second printing apparatus 4 can operate in the same manner as the first printing apparatus 1 before the error state.

Similarly to the storage section 12 of the first printing apparatus 1 before replacement, the storage section 42 of the second printing apparatus 4 stores the first communication setting information including at least the IP address-1 of the first printing apparatus 1 and the SSID-AP, the password-AP, and the certificate information of the AP 200, which can be used in the first communication mode, in a mutually associated manner. The controller 40 of the second printing apparatus 4 reads out such information and controls the communication section 41 to enable communication with the host device 2 in the first communication mode through the AP 200, similarly to the first printing apparatus 1 before the error state.

In addition, similarly to the storage section 12 of the first printing apparatus 1 before replacement, the storage section 42 of the second printing apparatus 4 stores the print setting information related to the printing section 43, such as a paper width setting and registered logo data. The controller 40 of the second printing apparatus 4 can read out such information and perform print setting related to the printing section 43.

When the communication section 41 receives print data, commands, or the like from the host device 2 in the first communication mode, the controller 40 of the second printing apparatus 4 can print, using the paper width and logo data set for printing by the printing section 43, the same receipt as in the first printing apparatus 1 before the error state.

In the POS system 100 or the like, when the first printing apparatus 1 used for wireless communication with the host device 2 becomes an error state due to a failure or the like, it is necessary to replace the first printing apparatus 1 with the new second printing apparatus 4. In particular, the second printing apparatus 4 used for business needs to be able to operate immediately after replacement.

As described above, in the first printing apparatus 1 and the second printing apparatus 4 having the same configuration as that of the first printing apparatus 1 in the present embodiment, the user can apply, only with a simple operation using the terminal device 3, the same setting as the first printing apparatus 1 before replacement to the second printing apparatus 4 and allow the second printing apparatus 4 to operate immediately after replacement.

Although the embodiment has been described in detail with reference to the drawings, specific configurations are not limited thereto, and changes, substitutions, deletions, and the like may be made without departing from the gist of the present disclosure.

For example, the first printing apparatus 1 and the second printing apparatus 4 have been described using an example of a line thermal head, but the printing method is not limited. For example, an ink jet head may be used.

In addition, the error state of the first printing apparatus 1 has been described using an example in which the printing section 13 can print on the recording paper. However, even in an error state in which the printing section 13 cannot print on the recording paper, when the first printing apparatus 1 includes a near field communication (NFC) tag and a reader/writer and the terminal device 3 also includes a reader/writer, the first communication setting information, the print setting information, and the like can be backed up or restored through the NFC tag.

In addition, a program such as the above-described firmware or utility program may be stored in a computer-readable storage medium, and the program may be read and executed by a computer system.

The program such as the above-described firmware or utility program may be transmitted from a computer system storing the program in a storage device or the like to another computer system through a transmission medium or by a transmission wave in the transmission medium. Here, the "transmission medium" for transmitting the program indicates a medium having a function of transmitting information and is exemplified by a network such as the Internet or a communication line such as a telephone line.

Moreover, the above-described program may be a program for realizing a part of the above-described functions. Further, the above-described program may be a so-called differential file or differential program capable of realizing the above-described functions in combination with a program already stored in the computer system.

What is claimed is:

1. A printing apparatus, comprising:
    a circuit configured to perform wireless communication with a first external device using a first communication mode and to perform wireless communication with a second external device using a second communication mode different from the first communication mode; and
    a head configured to print on recording paper,
    wherein
    the printing apparatus is configured to store first communication setting information related to the first communication mode, second communication setting information related to the second communication mode, and print setting information related to the head,
    the printing apparatus
    prints by the head, on the recording paper, a symbol image information that represents the stored second communication setting information when a predetermined input by a user is detected after a predetermined error state of the printing apparatus is occurred in a wireless communication state with the first external device using the first communication mode, and
    performs by the circuit, based on the stored second communication setting information, communication with the second external device using the second communication mode, and
    transmits, when a request from the second external device is received, the stored first communication setting information and the stored print setting information.

2. The printing apparatus according to claim 1, wherein
    the printing apparatus does not store, in an initial state, at least part of the first communication setting information and the print setting information, and
    the printing apparatus prints by the head, on the recording paper, a symbol image information that represents the stored second communication setting information, and
    the printing apparatus performs by the circuit, based on the second communication setting information, communication with the second external device using the second communication mode and
    the printing apparatus stores, when the first communication setting information and the print setting information are received, the first communication setting information and the print setting information.

3. The printing apparatus according to claim 2, wherein
    the printing device is configured to perform by the circuit, based on the stored first communication setting information, communication with the first external device using the first communication mode when a power is turned on or a restart is performed after the first communication setting information and the print setting information are stored, and
    the printing device performs, based on the stored print setting information, print setting related to the head.

4. The printing apparatus according to claim 1, wherein the first communication mode is an infrastructure mode, and the second communication mode is a Wi-Fi Direct simple AP mode.

5. The printing apparatus according to claim 1, wherein the first external device is a host device for settlement processing, the print setting information includes logo data, and the head is configured to print the logo data as a receipt.

6. The printing apparatus according to claim 1 further comprising,
    a switch or sensor configured to detect the predetermined input by the user, wherein
    the switch or sensor includes a first switch or sensor, and a second switch or sensor different from the first switch or sensor, and
    the printing apparatus
    prints by the head, on the recording paper, the symbol image information when the first switch or sensor detects a first input by the user, and
    performs by the circuit, when the second switch or sensor detects a second input by the user, communication with the second external device using the second communication mode.

7. A method of controlling a printing apparatus including a circuit configured to perform wireless communication with a first external device using a first communication mode and to perform wireless communication with a second external device using a second communication mode different from the first communication mode, a head configured to print on recording paper, wherein the printing device is configured to store first communication setting information related to the first communication mode, second communication setting information related to the second communication mode, and print setting information related to the printing section, the method comprising:
    printing by the head, on the recording paper, a symbol image information that represents the stored second communication setting information when a predetermined input by a user is detected after a predetermined error state of the printing apparatus is occurred in a wireless communication state with the first external device using the first communication mode, and
    performing by the circuit, based on the stored second communication setting information, communication with the second external device using the second communication mode, and
    transmitting, when a request from the second external device is received, the stored first communication setting information and the stored print setting information.

8. The method of controlling a printing apparatus according to claim 7, wherein
    the printing apparatus does not store, in an initial state, at least part of the first communication setting information and the print setting information, a symbol image information, that represents the stored second communication setting, information, is printed by the head on the recording paper, and the printing apparatus performs by the circuit, based on the second communication setting information, communication with the second external device using the second communication mode, and the printing apparatus stores, when the first communication setting information and the print setting information are received, the first communication setting information and the print setting information.

9. The method of controlling a printing apparatus according to claim 7, wherein when a power is turned on or a restart is performed after the first communication setting information and the print setting information are stored, the printing apparatus is configured to perform by the circuit, based on the stored first communication setting information, communication with the first external device using the first communication mode, and print setting related to the printing section is performed based on the stored print setting information.

10. The method of controlling a printing apparatus according to claim 7, wherein the first communication mode is an infrastructure mode, and the second communication mode is a Wi-Fi Direct simple AP mode.

11. The method of controlling a printing apparatus according to claim 7, wherein the first external device is a host device for settlement processing, the print setting information includes logo data, and the head is configured to print the logo data as a receipt.

12. The method of controlling a printing apparatus according to claim 7 further comprising, a switch or sensor configured to detect the predetermined input by the user, wherein the switch or sensor includes a first switch or sensor, and a second switch or sensor different from the first switch or sensor, the printing apparatus prints by the head, on the recording paper, the symbol image information when the first switch or sensor detects a first input by the user, and performs by the circuit, when the second switch or sensor detects a second input by the user, communication with the second external device using the second communication mode.

* * * * *